United States Patent
Thyagarajan et al.

(10) Patent No.: US 7,769,052 B2
(45) Date of Patent: Aug. 3, 2010

(54) TRANSIENT ROBUST CHANNEL FOR COMMUNICATION SYSTEMS

(75) Inventors: Umashankar Thyagarajan, München (DE); Vladimir Oksman, Morganville, NJ (US); Bernd Heise, Munich (DE); Stefan Uhlemann, München (DE)

(73) Assignee: Lantiq Deutschland GmbH, Neubiberg (DE)

( * ) Notice: Subject to any disclaimer, the term of this patent is extended or adjusted under 35 U.S.C. 154(b) by 520 days.

(21) Appl. No.: 11/752,991

(22) Filed: May 24, 2007

(65) Prior Publication Data

US 2008/0253401 A1  Oct. 16, 2008

Related U.S. Application Data

(60) Provisional application No. 60/911,545, filed on Apr. 13, 2007.

(51) Int. Cl.
*H04L 27/00* (2006.01)
*H04J 1/00* (2006.01)
*H04W 72/08* (2009.01)

(52) U.S. Cl. .................. 370/485; 370/241; 370/437; 370/465; 375/222; 375/260

(58) Field of Classification Search .......... 370/485, 370/242, 437, 465; 375/222, 260, 346
See application file for complete search history.

(56) References Cited

U.S. PATENT DOCUMENTS 5,682,419 A * 10/1997 Grube et al. ............. 455/450
6,865,232 B1 * 3/2005 Isaksson et al. .......... 375/260
2002/0080867 A1 * 6/2002 Abbas et al. ............. 375/222
2002/0126768 A1 * 9/2002 Isaksson et al. .......... 375/298
2005/0031047 A1 * 2/2005 Maltsev et al. ........... 375/260
2006/0176942 A1 * 8/2006 Oksman et al. ........... 375/222
2008/0069193 A1 * 3/2008 Shridhar et al. .......... 375/222

OTHER PUBLICATIONS

"VDSL@: Proposal for emergency rate reduction (SOS) in case of sudden increases in crosstalk", ITU—Telecommunication Standardization Sector Study Group 15, Temporary Document CD-057, Ministry of Information Industry of China, Huawei Technologies Co., Ltd., Conexant System, Inc., Denver, Colorado, Sep. 25-29, 2006, 4 pgs.

"G.vdsl: Faster OLR to avoid retrains caused by the XTALK of adjacent pair initialization", ITU—Telecommunication Standardization Sector Study Group 15, Temporary Document GB-035, Ministry of Information Industry of China, Huawei Technologies Co., Ltd., Ghent, Belgium, Jun. 12-16, 2006, 4 pgs.

(Continued)

*Primary Examiner*—Chi H Pham
*Assistant Examiner*—Ahmed Elallam
(74) *Attorney, Agent, or Firm*—Eschweiler & Associates, LLC

(57) ABSTRACT

One embodiment of the present invention relates to a network device. The network device includes a receiver configured to be coupled to a transmission medium supporting a multi-carrier channel over which data is communicated as symbols in a first communication state according to an initial bit-loading configuration. The receiver is further configured to detect noise that can corrupt the symbols on the multi-carrier channel. In addition, the receiver is configured to, in response to the detected noise, allocate at least part of the multi-carrier channel to a transient robust channel that facilitates adaptive communication. Other methods and devices are also disclosed.

25 Claims, 5 Drawing Sheets

OTHER PUBLICATIONS

"G.vds1: Proposal for SOS protocol", ITU—Telecommunication Standardization Sector Study Group 15, Temporary Document SD-074, Ikanos Communications, San Diego, California, Jan. 15-19, 2007, 4 pgs.

"VDSL2: Proposal for emergency rate reduction (SOS) in case of sudden increases in crosstalk", ITU—Telecommunication Standardization Sector Study Group 15, Temporary Document SD-077, Huawei Technologies Co., Ltd., Ministry of Information Industry of China, San Diego, California, Jan. 15-19, 2007, 6 pgs.

* cited by examiner

TRANSIENT ROBUST CHANNEL FOR COMMUNICATION SYSTEMS

RELATED APPLICATION

This application claims priority to U.S. Provisional Application Ser. No. 60/911,545 filed Apr. 13, 2007, entitled "FAST RECOVERY MECHANISM FOR COMMUNICATION SYSTEMS."

FIELD OF INVENTION

The present invention relates to generally to communication systems, and more particularly to adaptive communication systems.

BACKGROUND

In today's business climate, industry fortunes rise and fall on whether information is exchanged in an efficient manner. For example, cell phones, pagers, and the Internet have thrived because each technology allows businesses to exchange critical market information at a moment's notice. In addition, such technologies allow individuals to keep abreast of recent developments with family and friends. In short, many segments of our modern society require instant access to accurate, up-to-the-minute information.

Companies spend significant resources to develop modern communication systems that provide people with such information. As communication systems have matured, data rates have increased from 20 kilobits per second (Kb/s) in 1975 with dialup modems to 100 megabits per second (Mb/s) with modern VDSL and other network technologies. In other words, customers in today's "information age" can receive data approximately 5,000 times as fast as network customers of thirty years ago. To bring customers into this modern "information age", developers have spent billions of dollars to develop network technology as we now know it. To continue to increase data rates at such a remarkable pace, communication systems developers will likely be required to spend significant capital resources for many years to come.

Multi-carrier channels are one particular technology used to provide high speed data connections over a transmission medium. In previous implementations, the configuration of the multi-carrier channel is based on a signal-to-noise ratio (SNR) measured during initialization (i.e., prior to data transfer). Thus, in these systems, if the noise in the system suddenly increases during data transfer, the multi-carrier channel is not properly configured to account for the noise and many symbols and data packets can be lost. In applications that have streaming data (e.g., IP TV, Voice over IP (VoIP)), users may be able to visually or audibly detect this lost data in the data stream. This is unacceptable for service providers.

Therefore, while the existing methods and systems for communication systems that use multi-channel communication channels are sufficient for their stated purpose, they are not sufficient to accurately account for sudden noise on the transmission medium during communication service. Thus, improved methods and systems are needed.

SUMMARY OF THE INVENTION

The following presents a simplified summary of the invention in order to provide a basic understanding of some aspects of the invention. This summary is not an extensive overview of the invention, and is neither intended to identify key or critical elements of the invention nor to delineate the scope of the invention. Rather, the purpose of the summary is to present some concepts of the invention in a simplified form as a prelude to the more detailed description that is presented later.

One embodiment of the present invention relates to a network device. The network device includes a receiver configured to be coupled to a transmission medium supporting a multi-carrier channel over which data is communicated as symbols in a first communication state according to an initial bit-loading configuration. The receiver is further configured to detect noise that can corrupt the symbols on the multi-carrier channel. In addition, the receiver is configured to, in response to the detected noise, allocate at least part of the multi-carrier channel to a transient robust channel that facilitates adaptive communication.

The following description and annexed drawings set forth in detail certain illustrative aspects and implementations of the invention. These are indicative of but a few of the various ways in which the principles of the invention may be employed.

FIGURES

DETAILED DESCRIPTION OF THE INVENTION

Figure 1:
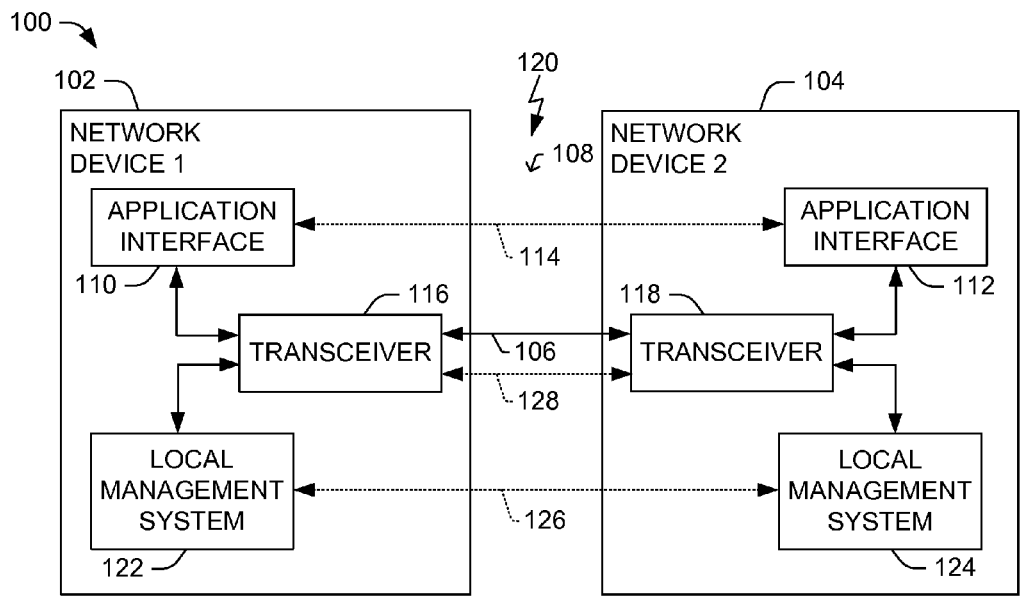
FIG. 1 illustrates one embodiment of a communication system that transmits data over a transmission medium.

The present invention will now be described with reference to the drawings wherein like reference numerals are used to refer to like elements throughout, and wherein the illustrated structures are not necessarily drawn to scale. Although various illustrated embodiments are described and illustrated as a hardware structure, the functionality and corresponding features of the present system can also be performed by appropriate software routines or a combination of hardware and software. Thus, the present invention should not be limited to any particular implementation and shall be construed to cover any implementation that falls within the spirit and scope of the claims.

FIG. 1 illustrates one communication system 100, comprising first and second network devices 102, 104, respectively, coupled to a transmission medium 106, wherein data is transferred between the network devices 102, 104 on a multi-carrier channel 108 supported by the transmission medium 106. Generally speaking, data is transmitted in a bi-directional sense (i.e., both network devices 102, 104 can send and receive data).

The network devices 102, 104 include application interfaces 110, 112, respectively, which are constructs for entering data into the system and outputting data from the system. During communication, data can be exchanged between the application interfaces 110, 112 over a data channel 114 supported by the transmission medium 106, as follows. One application interface (e.g., 110) may provide data to its associated transceiver (e.g., 116), which may encode and modulate the data as a stream of symbols onto the data channel 114. The other transceiver (e.g., 118) then receives this stream of symbols (which may be altered by noise 120 on the multi-carrier channel 108), and may demodulate and decode the data before passing it to the other application interface (e.g., 112).

During this communication process, the local management systems 122, 124 may coordinate control and timing changes via a local management channel 126. The local management channel 126 may comprise some dedicated carriers of the multi-carrier channel 108, or may comprise an embedded overhead channel of the multi-carrier channel (e.g., headers of the transmitted data packets).

During communication, the network devices 102, 104 are configured to monitor noise 120 on the multi-carrier channel 108, where the noise may corrupt communicated symbols, thereby causing the corrupted symbols to be received and decoded with errors. Generally speaking, the noise 120 may be Gaussian noise, impulse noise, or some other type of noise. After one of the network devices detects the noise 120, the network devices can open a transient robust channel 128, which includes at least one carrier of the multi-carrier channel 108. By opening the transient robust channel 128 for a limited time, the transient robust channel can provide for high-reliability exchange of communication parameters while consuming limited bandwidth for a limited time period. Therefore, bandwidth can be retained for high-priority services, such as IP TV or VoIP, with little or no interruption.

In one embodiment, the transient robust channel can comprise carriers that correspond to those of an administrative channel, such as the local management channel 126, embedded overhead channel or sum-of-sinusoids (SOS) channel, which is always open during communication between the network devices. In this embodiment, when noise 120 is detected on the multi-carrier channel 108, the network devices can alter the manner in which data is communicated over the administrative channel so that communication parameters can be robustly transmitted. After the communication parameters are robustly transmitted, the administrative channel can be reconfigured for typical (non-robust) communication. Thus, in this embodiment, the transient robust channel corresponds to a channel that is always present during communication, but is transient in the sense that robustness is not always present during communication. Other embodiments of a transient robust channel are also included further herein.

Figure 2:
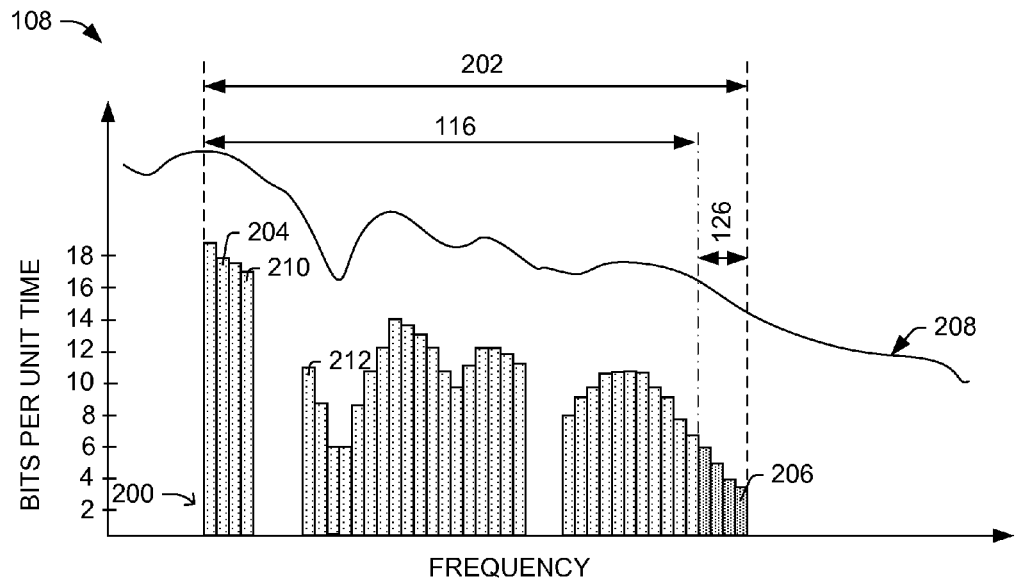
FIG. 2 shows one embodiment of a multi-carrier channel that carries data over the transmission medium.

To provide some context for these additional embodiments, FIG. 2 shows a more detailed embodiment of a multi-carrier channel 108 on which the network devices 102, 104 can communicate. As shown, the multi-carrier channel 108 comprises a number of frequencies (or "carriers" 200) that span a frequency spectrum 202 supported by the transmission medium 106. In effect, by breaking the frequency spectrum 202 into multiple carriers, the network devices can transmit data over each of the carriers (instead of just a single carrier), thereby allowing them to "stuff" more data through the transmission medium per unit time. In FIG. 2's illustrated embodiment, the multi-carrier channel 108 is split between the data channel 116 and the management channel 126. Accordingly, the illustrated data channel 116 comprises some dedicated frequencies (data carriers 204) while the illustrated management channel comprises other dedicated frequencies (management carriers 206). As mentioned, in other embodiments employing an embedded overhead channel, all of the carriers will be shared for data and management, and there need not be a division between dedicated data carriers and dedicated management carriers.

During communication, a specific number of bits per unit time may be transmitted on each carrier based on a signal-to-noise ratio (SNR) 208. Typically, more bits are transmitted on carriers that have a relatively high SNR, while fewer bits are transmitted on frequencies that have a relatively low SNR. For example, carrier 210 has a relatively high SNR compared to carrier 212. Correspondingly, the network devices transmit more bits on carrier 210 (i.e., approximately 17 bits per unit time), and fewer bits on carrier 212 (i.e., approximately 11 bits per unit time). Although encoding and decoding data conveyed on multiple frequencies makes this multi-carrier communication computationally complex, it gives the network devices the ability to provide users with high speed data connections with relatively few errors.

Figure 3:
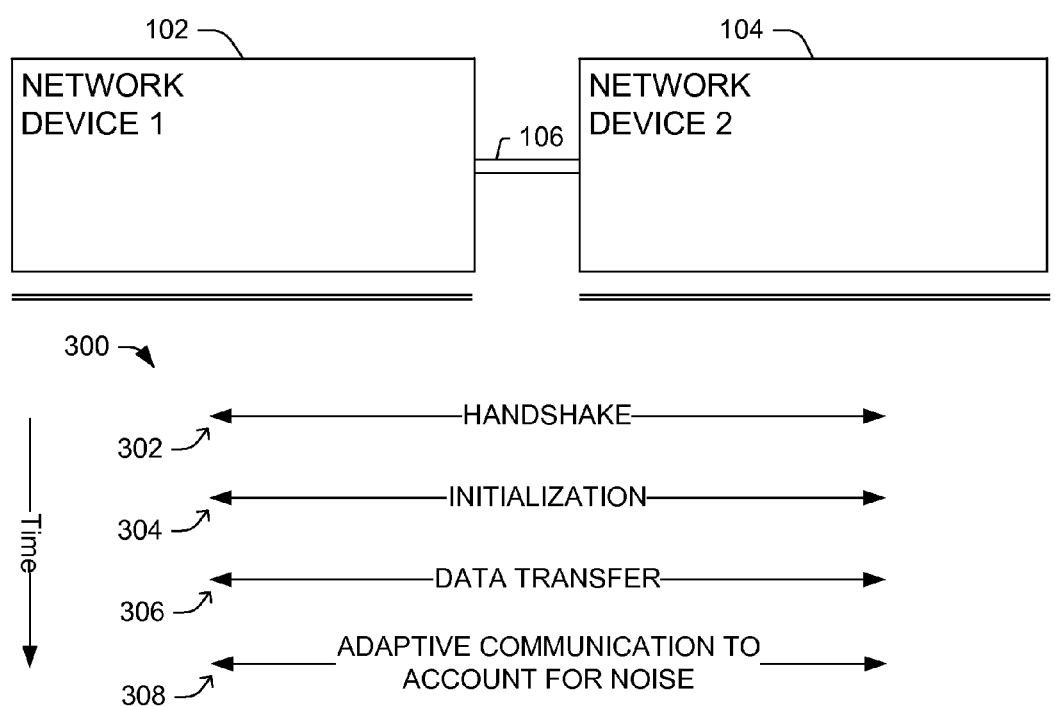
FIG. 3 shows one embodiment of a communication protocol in which network devices carry out adaptive communication to account for noise.

In order to mitigate the effects of a sudden increase in noise on the multi-carrier channel, the network devices 102, 104 may undergo adaptive communication procedures in which they employ a transient robust communication channel. For example, FIG. 3 shows a somewhat general adaptive communication procedure, while FIGS. 4-8 show a more detailed adaptive communication procedure. While these methods are illustrated and described below as a series of acts or events, it will be appreciated that the present invention is not limited by the illustrated ordering of such acts or events. For example, some acts may occur in different orders and/or concurrently with other acts or events apart from those illustrated and/or described herein. In addition, not all illustrated steps may be required to implement a methodology in accordance with one or more aspects or embodiments of the present invention. Further, one or more of the acts depicted herein may be carried out in one or more separate acts and/or phases.

Referring now to FIG. 3, one can see a somewhat general communication protocol 300, wherein horizontal lines can indicate stages of communication between the network devices 102, 104. The illustrated communication protocol 300 includes several states, namely: handshake 302, initialization 304, data transfer 306, and adaptive communication to account for noise 308. Generally speaking, the network devices 102, 104 can set initial communication parameters based on an initial SNR detected prior to data transfer (e.g., during handshake 302 or initialization 304). The network devices can then cooperatively adjust the communication parameters during adaptive communication 308 by using a transient robust channel to account for any subsequent noise. Adaptive communication may include a modified data transfer stage.

Figure 4:
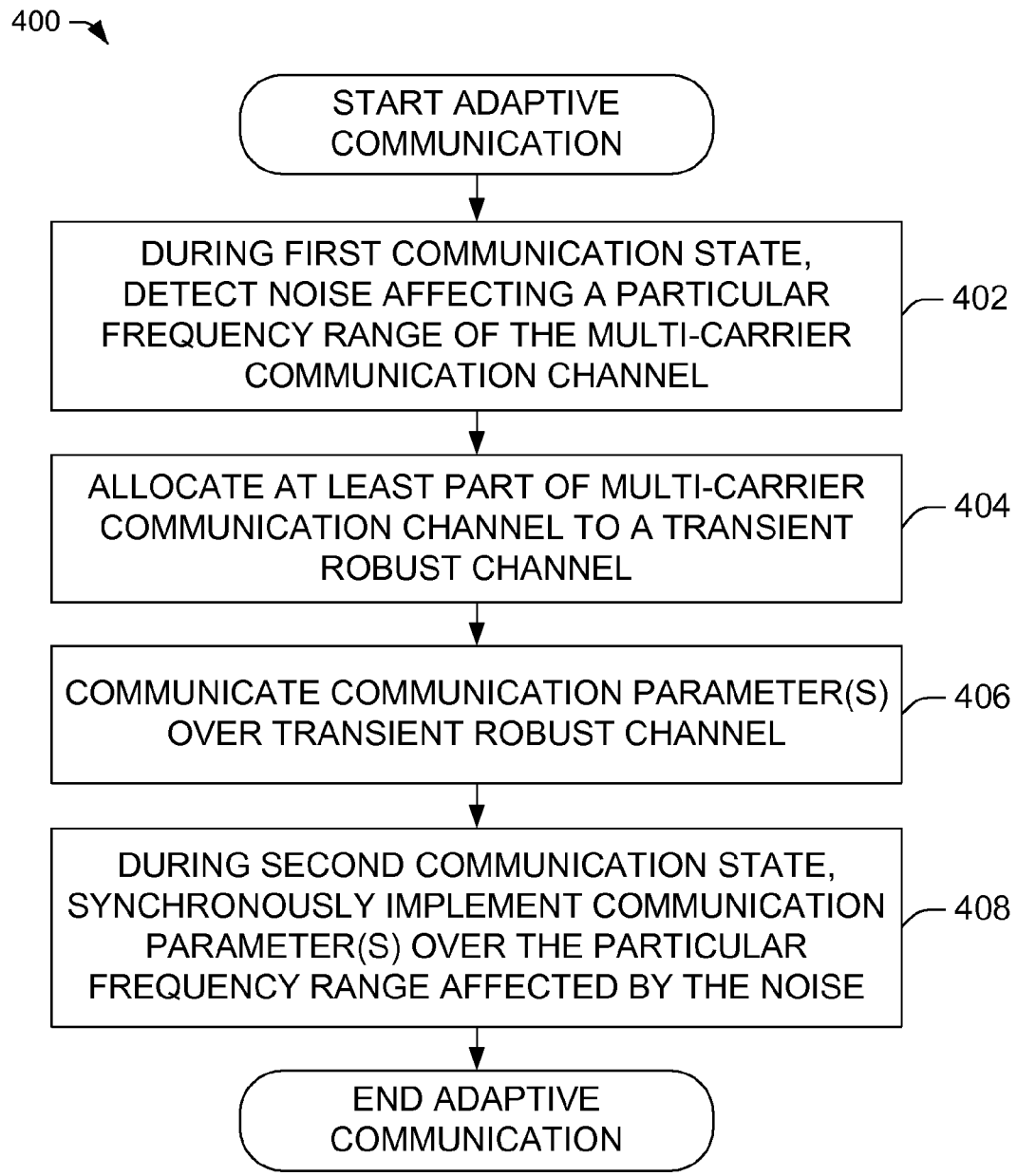
FIG. 4 shows a flowchart of a more detailed embodiment of adaptive communication.

FIG. 4 and FIGS. 5-8 show a more detailed method 400 for adaptive communication. This method 400 is now described with reference to a flow diagram (FIG. 4) and schematic representations (FIGS. 5-8), which are discussed in the context of a multi-carrier channel. FIG. 4's illustrated flow diagram shows general functional stages, while the schematic representations of FIGS. 5-8 show the multi-carrier channel during the various functional stages.

Referring now to FIG. 4, one can see that the more detailed method 400 begins in 402 when, during a first communication state (e.g., data transfer 306), one of the network devices 102 or 104 detects noise that affects a particular frequency range of the multi-carrier channel (see also FIG. 5, discussed below). In one embodiment, the network device receiving data detects the noise by analyzing the extent to which noise has corrupted the stream of symbols received from the other network device. After the network device has detected the noise, the network devices 102, 104 allocate at least a part of the multi-carrier channel to a transient robust channel in block 404 (see also FIG. 6, discussed below). Next, in 406, the network device communicates communication parameters that account for the detected noise over the transient robust channel. In 408, during a second communication state (e.g., modified data transfer), the network devices 102, 104 synchronously implement the communication parameters over the particular frequency range affected by the noise (see also FIGS. 7-8, discussed below).

Figure 5:
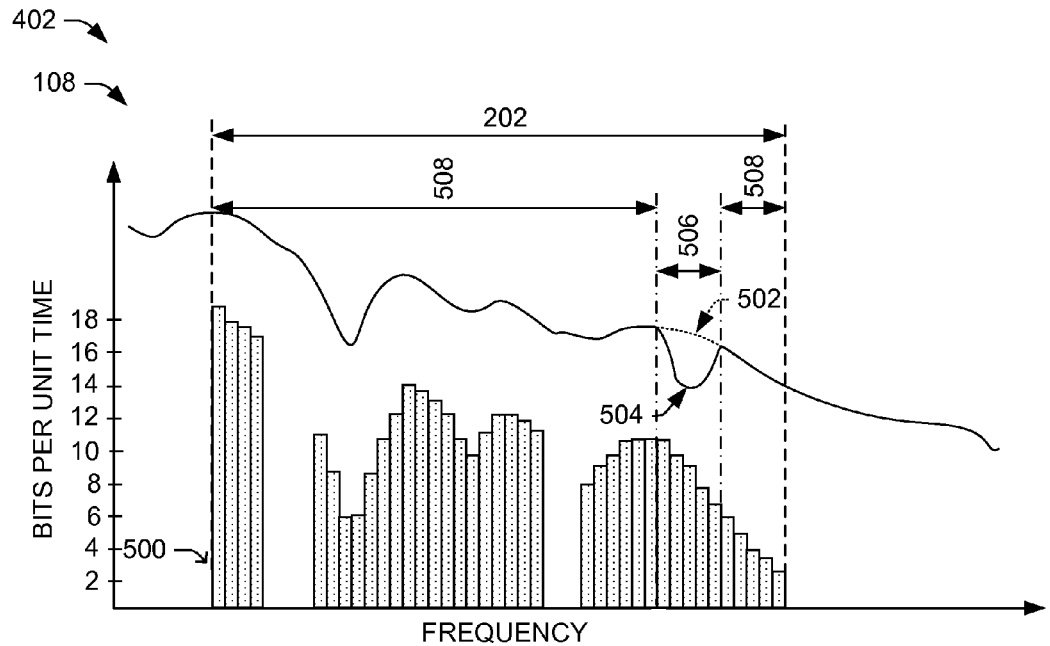
FIGS. 5-8 show a multi-carrier channel at various blocks of the adaptive communication embodiment of FIG. 4.

Referring now to FIG. 5, one can see the multi-carrier channel 108 during the first communication state 402, where noise affects a particular frequency range 506 and can corrupt entire transmitted symbols such that they are received with errors. During this first communication state 402, the carriers 500 can have an initial bit-loading configuration that is set as a function of the initial SNR 502 detected during initialization, and not necessarily set according to the present SNR 504. Thus, in the illustrated embodiment, the noise has caused the present SNR 504 to drop in the particular frequency range 506, although the bit-loading configuration is still set according to the initial SNR 502 in this frequency range. Thus, in an unaffected frequency range 508, the present SNR 504 may remain at substantially initial levels (i.e., some noise may still be present, but not enough to corrupt symbols causing them to be decoded in error).

In one embodiment, the receiving network device may detect the noise based on the extent to which DMT frames or payload frames are corrupted. In one embodiment, whether a frame or payload is corrupted can be determined based on CRC (cyclic redundancy check) and/or information derived from the forward error correction (Reed-Solomon Coding). In other embodiments, one of the network devices may detect the noise by measuring SNR, voltages, or some other electrical characteristic.

In some embodiments, the detected noise will not adversely affect all of the carriers in the affected frequency range 506, but rather only some of these carriers. For example, in FIG. 5, the affected frequency range 506 includes five carriers. Depending on the situation, noise could affect only one of these carriers or several of these carriers, but could still corrupt each entire symbol transmitted per unit time. To properly characterize the detected noise, the receiving network device may determine which carriers are affected by the noise, and then set the affected frequency range 506 based on those affected carriers. For example, to determine which carriers are affected, the network device could use a sliding window that includes only some of the carriers spanning the frequency spectrum 202 at any given time. The network device could then successively step the window across the frequency spectrum 202, and with each step determine whether any of the carriers within the window are affected by the noise. If the number of affected within the window exceeds some threshold, then the network device could set the frequency range 506 accordingly.

Figure 6:
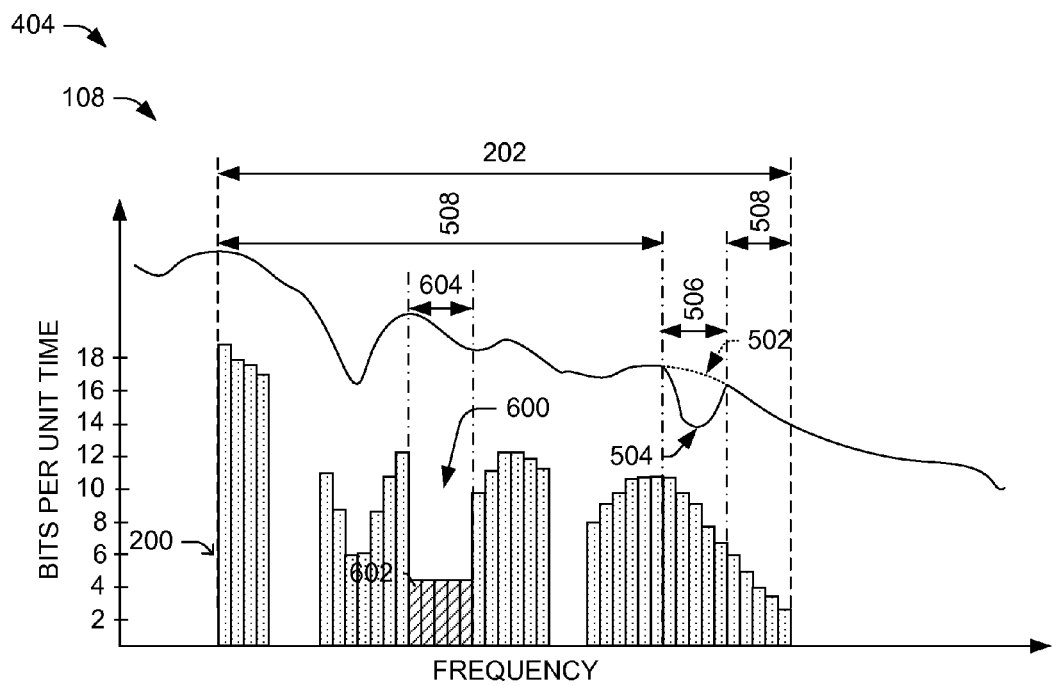

After the noise has been detected and the affected frequency range 506 has been characterized, the network devices open a transient robust channel 600, such as shown in FIG. 6. In the illustrated embodiment, the transient robust channel 600 comprises a group of at least one dedicated transient robust carrier 602 that is in a frequency range 604 that is unaffected by the noise. Because this group of dedicated transient robust carriers falls outside of the noise frequency range 506, it is more likely that communication over the transient robust channel 600 will be error-free. In other embodiments, however, some of the dedicated transient robust carriers could fall within the noise frequency range 506. For example, in one embodiment, the group of dedicated transient robust carriers could comprise all of the carriers of the multi-carrier channel.

In various embodiments, transient robust channel 600 is characterized by a flat bit-loading configuration, where N bits are transmitted on each transient robust carrier. For example, in FIG. 6's illustrated embodiment, the transient robust channel comprises five transient robust carriers that each carries 4 bits per unit time. The bit-loading for the transient robust channel could be pre-determined (i.e., a system default) or could be negotiated by the network devices during communication.

In another (un-illustrated) embodiment, the transient robust channel can comprise modulation of periodic synchronization symbols, which occur every 256 symbols in case of VDSL2 (1 symbol=250 us for some DMT systems). However, in this modulation approach, the capacity of such a channel may be relatively small, and the periodic synchronization symbols will not typically be used for other purposes like equalizer training or SNR measurements.

The network devices can synchronously open the robust transient channel 600 by using a marker sent from the receiving network device to the transmitting network device. This marker can be any symbol with a pre-defined content, an inverted synchronization symbol, signaling via an embedded operations channel (less reliable), signaling using reserved DMT carriers, or a temporary change of modulation method.

After the transient robust channel 600 has been established, the network device that detects and characterizes the noise sends at least one communication parameter over the transient robust channel 600 to the other network device. To combat the detected noise, these communication parameters can include specific carriers and modified bit-loading parameters to be implemented on those carriers during a second communication state. For example, in one embodiment, the communication parameters could indicate a start carrier and stop carrier corresponding to the frequency range 506 affected by the noise, as well as a flat-bit loading value to be used on these carriers. In another embodiment, the communication parameters could uniformly reduce bit-loading for the specified frequency range, (i.e., reduction by same number of bits per carrier within the specified frequency range.)

Because the frequency range 506 may include carriers affected by noise as well as those unaffected by noise, a simplified bitloading scheme may be employed. For example, by using a start-frequency, stop-frequency and a simple bit-loading scheme (e.g., uniform reduction, flat bit-loading, etc.), the communication parameters to include less information (i.e., start frequency, stop frequency, and bit-loading to be applied to this frequency range) than if each frequency had to be individually coded as affected by noise or unaffected by noise and the bit-loading scheme for each (i.e., carrier #542 reduced by 2 bits per unit time, carrier #544 reduced by 4 bits per unit time, carrier #568 reduced by 8 bits per unit time, etc.). Because this scheme includes less information, it can be transmitted more quickly and more robustly than prior solutions.

Figure 7:
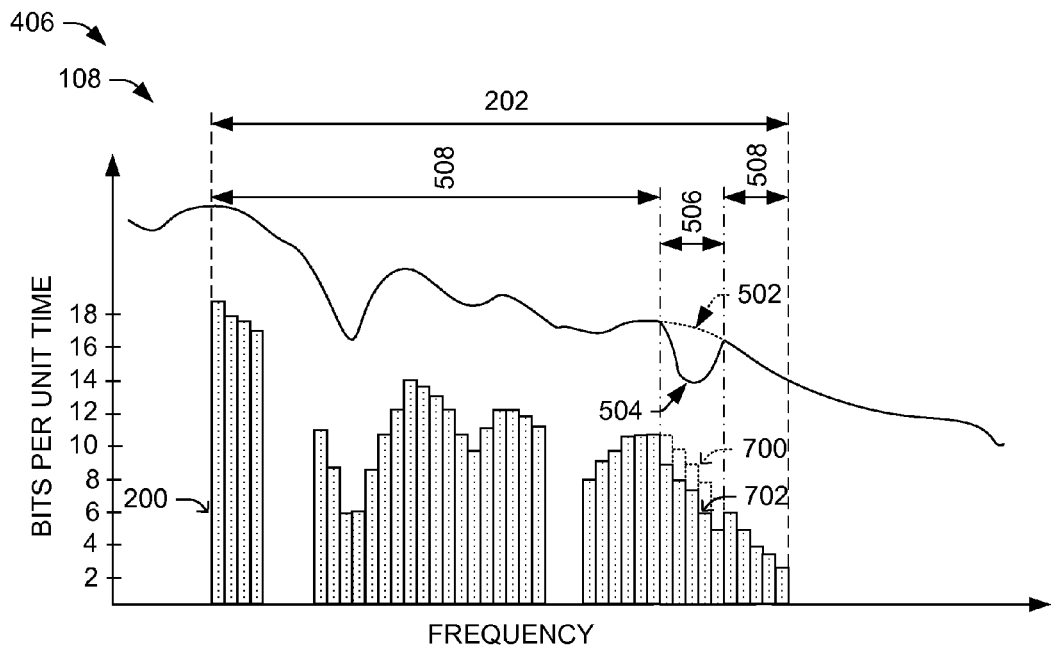
Figure 8:
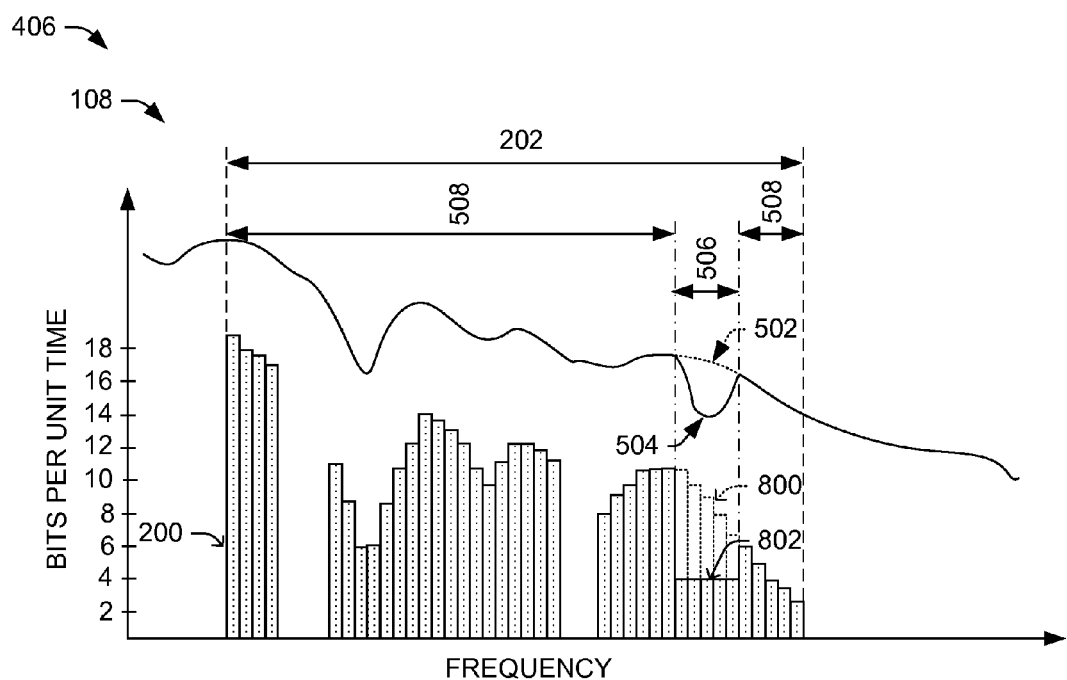

After the communication parameters have been exchanged over the transient robust channel, the network devices can enter the second communication state (e.g., modified data transfer) where they close the transient robust channel to free-up bandwidth for other services. FIGS. 7-8 illustrate two sample embodiments. Generally speaking, when the transient robust channel 600 is closed, it allows the multi-carrier channel 108 to be reconfigured such that bandwidth is decreased only for the particular frequency range 506 affected by noise, while the bandwidth corresponding to the carriers in the unaffected frequency range 508 is kept at initial levels. The network devices can implement the communication parameter in a single stage (i.e., across all carriers associated with the affected frequency range 506), or in multiple stages (i.e., successively across several groups of carriers that make up the affected frequency range 506).

As shown in FIG. 7, during the second communication state 406, a modified bit-loading configuration for carriers in the noise-affected frequency range 506 has been implemented. As shown, each carrier in the affected frequency range has changed its bit-loading from an initial bit-loading configuration 700 to a uniformly reduced bit-loading configuration 702. More particularly, in the illustrated embodiment, each of the carriers has had its bit-loading reduced by approximately 2 bits per unit time, although in other scenarios the bit-loading could be reduced by any number of bits per unit time.

FIG. 8 shows another embodiment of the second communication state where the network devices have synchronously implemented a flat bit-loading configuration for carriers affected by the noise. As shown, each carrier in the affected frequency range has changed its bit-loading from an initial bit-loading configuration 800 to a flat bit-loading configuration 802. In the illustrated embodiment, each of the carriers affected by noise now uses approximately 4 bits per unit time, although they could use any number of bits per unit time depending on the scenario.

To indicate the start of the second communication state, one of the network devices sends a pre-defined symbol to the other network device in various embodiments. The network devices can synchronously implement the modified bit-loading configuration N symbols after the marker is exchanged. In other embodiments, one of the network devices sends a pre-defined symbol at a pre-defined position with respect to a superframe, and the network devices change bit-loading N symbols after reception of the pre-defined symbol. In still other embodiments, the network devices change bit-loading N symbols after they opened the transient robust channel.

Although the communication system 100 and several of its components have been described above, it will be appreciated that the present invention includes countless other variations that are contemplated as falling within the scope of the invention. For example, in various embodiments, a transmission medium 106 can comprise wireline transmission medium(s) including, but not limited to: wire transmission lines (e.g., twisted pair of copper wires), cable transmission lines (e.g., coax cable), and optical transmission lines. Other illustrative transmission mediums could include wireless transmission mediums (e.g., the atmosphere), or combinations of wireline transmission mediums and wireless transmission mediums.

In addition, the network devices could manifest themselves in various forms, depending on the implementation. For example, in one embodiment, one network devices could be located at a customer's residence in the form of a residential gateway (RG) or a DSL modem (CPE), while another communication endpoint could be a DSL modem located at a central office (CO) that distributes data to multiple CPE modems. In various embodiments, one or both network devices could comprise some other electronic device, including but not limited to: a computer, a television or some other visual display system, a videoconferencing device, a camera, a music player, a fax machine, a cell phone, a home or office phone, a refrigerator, or some other digital device.

EXAMPLE

In one embodiment, the network devices 102, 104 could be DSL modems that communicate with each other over a transmission medium 106 that comprises a twisted pair of copper wires, such as a residential phone line. For purposes of illustration, a more detailed embodiment where the network devices comprise VDSL2 modems is set forth below. It will be appreciated that the VDSL2 implementation is only one embodiment, and that the present invention is applicable to other technologies as well.

VDSL2 typically transports (Ethernet-)packets. Each packet is protected with a CRC by the transmission convergence layer (TPS-TC) of the VDSL2 modem. This TC-CRC is monitored by the receiving modem and defective packets are not forwarded. To detect a condition for fast system recovery, this example is based on a sliding window over the TC-CRC. If more than U consecutive packets during a time T0 are found to be corrupted, fast recovery using a transient robust channel is initiated. Note that this approach avoids fast recovery in case of non-utilized links, i.e. while the user is inactive. In these cases, the system can tolerate a short duration of service unavailability and eventually go through a regular re-initialization, since the user will not recognize the interruption of the service.

The transient robust channel is opened by a pre-determined symbol. If this pre-determined symbol is detected by the receiver, subsequent symbols are known to be modulated as transient robust channel. Since in case of fast recovery the regular data exchange is deficient already, it is advantageous to make use of all carriers of the multi-carrier channel for reliable transmission.

The pre-determined symbol could be an inverted sync-symbol (also called sync-flag), which is sent by the receiver after determining the need for fast recovery. Any pending, standardized online-reconfiguration activities of VDSL2 modems (which make use of periodic sync-flags as well) are terminated with immediate effect. If the detection of fast recovery falls at the same time as a sync-flag for online-recovery, the sync-flag for fast recovery is delayed by one symbol. One or more sync-flags for fast recovery will be sent by the receiver and detected.

After the transmitter has detected the sync-flags, the modems begin the pre-determined modulation for the transient robust channel starts. The back-channel is placed in one or more of the following data symbols. Parts or the entire symbol(s) are modulated with the back channel information. One implementation is to modulate the information on a subset of K DMT-carriers with a reduced number of bits per carrier. K is preferred to be significantly smaller than the total number N of DMT carriers. This subset could be repeated several times over in the same symbol and/or repeated in the following symbols. It could be repeated such that it uses up the total DMT carriers.

The information modulated on the K carriers is therefore available in a redundant way, spread over the spectrum and time. A preferred modulation technique is a 2-bit QAM modulation. The selection of K allows the modems to adapt the data-rate of the transient robust channel. If the amount of data for the transient robust channel is 28 bits, K=28/2=14. All data is modulated on a single DMT symbol. This symbol may be repeated Z times; where Z=3.

The simplified model divides the frequency spectrum into bands. Inside each band, the modified bit-loading is the old bit loading minus R. If the resulting number of bits per carrier becomes negative, it is set to 0. For example with R=2, a carrier which used to be modulated with 11 bits is reduced to 11−2=9 bits. The receiver needs to determine only the start carrier (Tstart) and stop carrier (Tstop) of the band which experiences the strongest noise and decide on a reduction R. Then Tstart, Tstop, R are the only parameters to be sent back to the transmitter. The total amount of data is only 28 bits in this case (12 bit per carrier index, 4 bits for R).

In other embodiments, a flat bit loading (all carriers inside a band are set to S Bits) or exchange of multiple bands with modified (flat or reduced) loading.

An efficient but quick synchronization is based on the symbol count after detection of the first sync-flag which triggered fast resynchronization. Bit-loading is changed W symbols after initial detection; W=6. Note that with this high speed of bit-rate reduction it is also possible to go through several iterations of fast recovery. Each time either only 1 or 2 bits are reduced and the resulting system stability is checked (i.e. by means of the TPS-TC CRC) or multiple bands are used, one per fast recovery iteration.

One way to achieve controlled latency is to disable interleaving (interleaving depth=1) at the first occurrence of fast recovery. But other values of interleaver and framing parameters could also be communicated via the transient robust channel.

Finally, the system needs a way to recover and return to an original state, provided the noise disappeared. Since there is typically no extreme urgency in performing this change, the standardized online-reconfiguration procedures of VDSL2 can be applied to re-adjust interleaver-parameters, framing-parameters (if necessary) and the data-rate.

In regard to the various functions performed by the above described components or structures (blocks, units, engines, assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A network device, comprising:
a receiver configured to be coupled to a transmission medium supporting a multi-carrier channel over which symbols are communicated according to an initial bit-loading configuration, and further configured to detect noise that can corrupt the symbols on the multi-carrier channel;
where the receiver is configured to, in response to the detected noise, allocate part of the multi-carrier channel to a transient channel having a transient bit-loading configuration while other parts of the multi-carrier channel maintain the initial bit-loading configuration, where the transient bit-loading configuration differs from the initial bit-loading configuration for the part of the multi-carrier channel associated with the transient channel.

2. The network device of claim 1, where the transient channel comprises carriers that correspond to carriers of an administrative channel which is always open during communication, and where communication parameters are robustly communicated over the carriers of the administrative channel after which the administrative channel is reconfigured for non-robust communication.

3. The network device of claim 1, where the receiver is further configured to communicate a modified bit-loading configuration over the transient channel, where the modified bit-loading configuration reduces bit-loading on carriers affected by the detected noise.

4. The network device of claim 3, where the modified bit-loading configuration provides a common number of bits to be loaded on all carriers on which a symbol was corrupted by the detected noise.

5. The network device of claim 3, where the modified bit-loading configuration reduces the number of bits per carrier by the same number of bits per carrier for all carriers on which a symbol was corrupted by the detected noise.

6. The network device of claim 3, where the receiver is configured to return the part of the multi-carrier channel associated with the transient channel to the initial bit-loading configuration after the modified bit-loading configuration is communicated.

7. The network device of claim 3, where the receiver is configured to transmit multiple copies of the modified bit-loading parameter on the transient channel, where each of the multiple copies is transmitted at a different time or over a different frequency.

8. The network device of claim 1, where the transient channel comprises multiple carriers, and where the transient bit-loading configuration provides a common number of bits to be loaded on each of the multiple carriers associated with the transient channel.

9. The network device of claim 1, where the receiver is configured to transmit or receive a symbol with pre-determined content to indicate opening of the transient channel.

10. The network device of claim 1, where the detection of the corrupted symbols is implemented in multiple stages with each stage checking for corrupted symbols on a successive group of carriers.

11. A method of communicating over a network, comprising:
transmitting data over a plurality of carriers associated with a multi-carrier channel according to an initial bit-loading configuration,
while the initial bit-loading configuration is followed:
detecting a first group of carriers within the plurality of carriers whose symbols are corrupted by noise and detecting a second group of carriers within the plurality of carriers whose symbols are not corrupted by the noise;
allocating at least one carrier from the second group of carriers to a transient channel having a transient bit-loading configuration while the first group of carriers remain allocated to the initial bit-loading configuration, where the transient bit-loading configuration differs from the initial bit-loading distribution.

12. The method of claim 11, where the transient bit-loading configuration comprises a common number of bits on each of multiple carriers allocated to the second group of carriers.

13. The method of claim 11, where the transient channel comprises multiple carriers, and where the transient bit-loading configuration provides a common number of bits to be loaded on each of the multiple carriers associated with the transient channel.

14. The method of claim 11, further comprising:
communicating a modified bit-loading configuration over the second group of carriers according to the transient bit-loading configuration while the first group of carriers follows the initial bit-loading distribution.

15. The method of claim 14, further comprising:
after communicating the modified bit-loading configuration, changing bit-loading on the first group of carriers to correspond to the modified bit-loading configuration.

16. The method of claim 14, further comprising:
after communicating the modified bit-loading configuration, returning bit-loading on the at least one carrier of the second group from the transient bit-loading configuration to the initial bit-loading configuration.

17. A network device, comprising:
a receiver configured to be coupled to a transmission medium supporting a multi-carrier channel over which symbols are communicated according to an initial bit-loading configuration, and further configured to discern between a first group of carriers having noise-corrupted symbols and a second group of carriers having symbols that are uncorrupted by noise; and
where the receiver is configured to, in response to discerning the noise corrupted symbols, assign a carrier from the second group of carriers to a transient channel that follows a transient bit-loading configuration while the first group of carriers remain allocated to the initial bit-loading configuration; where the transient bit-loading configuration differs from the initial bit-loading configuration with regards to the second group of carriers.

18. The network device of claim 17, where the receiver is configured to transmit a modified bit-loading configuration over the transient channel in accordance with the transient bit-loading configuration.

19. The network device of claim 18, where the receiver is configured, after transmitting the modified bit-loading configuration, to change bit-loading on the first group of carriers to follow the modified bit-loading configuration and to return bit-loading on the transient channel to follow the initial bit-loading configuration.

20. The network device of claim 18, where the modified bit-loading configuration provides a common number of bits to be loaded on each carrier within the first group.

21. The network device of claim 18, where the modified bit-loading configuration reduces the number of bits per carrier by the same number of bits per carrier for each carrier within the first group.

22. The network device of claim 17, where multiple carriers are assigned to the transient channel, and where the transient bit-loading configuration provides a common number of bits to be loaded on each of the multiple carriers associated with the transient channel.

23. The network device of claim 17, where multiple carriers are assigned to the second group, and where the transient bit-loading configuration comprises a common number of bits on each of the multiple carriers assigned to the second group.

24. The method of claim 23, where the modified bit-loading configuration provides a common number of bits to be loaded on each carrier within the first group.

25. The method of claim 23, where the modified bit-loading configuration reduces the number of bits per carrier by the same number of bits per carrier for each carrier within the first group.

* * * * *